US009889862B2

(12) United States Patent
Prakah-Asante et al.

(10) Patent No.: US 9,889,862 B2
(45) Date of Patent: Feb. 13, 2018

(54) WORKLOAD ESTIMATION FOR MOBILE DEVICE FEATURE INTEGRATION

(71) Applicant: Ford Global Technologies, LLC, Dearborn, MI (US)

(72) Inventors: Kwaku O. Prakah-Asante, Commerce Township, MI (US); Basavaraj Tonshal, Northville, MI (US); Hsin-hsiang Yang, Ann Arbor, MI (US); Gary Steven Strumolo, Canton, MI (US); Yifan Chen, Ann Arbor, MI (US); James Stewart Rankin, II, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 362 days.

(21) Appl. No.: 14/242,278

(22) Filed: Apr. 1, 2014

(65) Prior Publication Data
US 2015/0274180 A1 Oct. 1, 2015

(51) Int. Cl.
B60W 50/14 (2012.01)
B60W 40/09 (2012.01)
H04W 8/22 (2009.01)
B60K 35/00 (2006.01)
B60W 50/00 (2006.01)

(52) U.S. Cl.
CPC ............ B60W 50/14 (2013.01); B60K 35/00 (2013.01); B60W 40/09 (2013.01); H04W 8/22 (2013.01); B60K 2350/967 (2013.01); B60W 50/0097 (2013.01); B60W 2050/0089 (2013.01); B60W 2050/143 (2013.01); B60W 2050/146 (2013.01); B60W 2540/22 (2013.01); B60W 2540/30 (2013.01); B60W 2550/12 (2013.01); B60W 2550/402 (2013.01)

(58) Field of Classification Search
CPC ......... H04W 4/008; H04M 1/66; B60K 28/63
USPC ........ 701/23; 340/439, 576; 455/418, 456.1, 455/456.4, 565, 566
See application file for complete search history.

(56) References Cited

U.S. PATENT DOCUMENTS

| 6,262,657 | B1* | 7/2001 | Okuda | B60K 28/066 340/438 |
| 6,754,183 | B1* | 6/2004 | Razavi | G01C 21/26 370/254 |
| 2010/0093405 | A1* | 4/2010 | Ewell et al. | 455/566 |
| 2010/0102972 | A1* | 4/2010 | Middlekauff | B60K 28/066 340/576 |
| 2010/0197351 | A1* | 8/2010 | Ewell et al. | 455/565 |
| 2011/0077028 | A1* | 3/2011 | Wilkes, III | B60W 50/14 455/456.3 |
| 2011/0128118 | A1* | 6/2011 | Gilleland | B60R 25/24 340/5.2 |
| 2011/0244890 | A1* | 10/2011 | Lehmann et al. | 455/456.4 |

(Continued)

Primary Examiner — Thomas G Black
Assistant Examiner — Wae L Louie
(74) Attorney, Agent, or Firm — Jennifer M. Stec; Brooks Kushman P.C.

(57) ABSTRACT

A system may include a device configured to connect to a vehicle data port and a mobile device and including an alert manager. The alert manager may be configured to determine, according to a driver workload estimation, an alert mode indicative of how to process a vehicle user-interface request to access a mobile device feature for use via the vehicle user-interface, and access the feature of the mobile device in accordance with the alert mode.

20 Claims, 6 Drawing Sheets

(56) References Cited

U.S. PATENT DOCUMENTS

| | | | |
|---|---|---|---|
| 2012/0129545 A1* | 5/2012 | Hodis et al. | 455/456.1 |
| 2012/0253552 A1* | 10/2012 | Skelton | 701/2 |
| 2012/0268235 A1* | 10/2012 | Farhan et al. | 340/3.1 |
| 2013/0131905 A1* | 5/2013 | Green et al. | 701/23 |
| 2013/0135109 A1* | 5/2013 | Sharon | G08B 21/02 340/576 |
| 2013/0162794 A1* | 6/2013 | Wakiyama | 348/77 |
| 2014/0087708 A1* | 3/2014 | Kalita et al. | 455/418 |
| 2014/0302834 A1* | 10/2014 | Jones | 455/418 |
| 2014/0335902 A1* | 11/2014 | Guba et al. | 455/456.4 |
| 2015/0024727 A1* | 1/2015 | Hale-Pletka | H04W 4/008 455/418 |
| 2015/0274180 A1* | 10/2015 | Prakah-Asante | B60W 40/09 701/36 |

* cited by examiner

US 9,889,862 B2

WORKLOAD ESTIMATION FOR MOBILE DEVICE FEATURE INTEGRATION

TECHNICAL FIELD

The present disclosure generally relates to vehicle infotainment systems, and more particularly, to utilizing workload estimation to facilitate safe integration of features of a mobile device with the vehicle infotainment systems.

BACKGROUND

Portable phones and other mobile devices have become increasingly popular to use. These devices may support various features, such as voice command recognition, navigation, music playback, as some examples. Use of such devices within the vehicle environment may be difficult or may require user interaction management if the user is driving.

SUMMARY

In a first illustrative embodiment, a system includes a device configured to connect to a vehicle data port and a mobile device, and including an alert manager configured to determine, according to a driver workload estimation performed using data received from the data port, an alert mode indicative of how to process a vehicle user-interface request to use a mobile device feature, and access the mobile device feature via the vehicle user-interface according to the alert mode.

In a second illustrative embodiment, a method includes determining an alert mode indicative of how to process a vehicle user-interface request to use a mobile device feature, by an alert manager of a device connecting to a vehicle data port and a mobile device, according to a driver workload estimation performed using data received from the data port; and accessing the mobile device feature via the vehicle user-interface according to the alert mode.

In a third illustrative embodiment, a non-transitory computer-readable medium includes instructions that, when executed by an alert manager of a device connecting to a vehicle data port and a mobile device, cause the device to determine an alert mode indicative of how to process a vehicle user-interface request to use a mobile device feature according to a driver workload estimation performed using data received from the data port; and access the mobile device feature via the vehicle user-interface according to the alert mode.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the vehicle cabin, drivers may be provided with information from connected telematics services with which the vehicle may be in communication. However, in some cases a driver may wish to make use of services available via his or her mobile device instead. A connected device adapter may be utilized to enable services and features of mobile devices to be integrated into the vehicle telematics system. The connected device adapter may include a dongle or other connector configured to connect to an information port of the vehicle, such as to an On-Board Diagnostic (OBD-II) port. When the connected device adapter is further connected to a mobile device such as a smartphone, the devices may be integrated such that the driver of the vehicle may make use of features of the mobile device. In an example, a button press of a push-to-talk control on the vehicle steering wheel may allow access to voice command features of the connected mobile device, such as access to Siri on a connected Apple iPhone.

An alert manager of the connected device manager may be utilized to provide coordination of mobile device usage via the connected device adapter. The alert manager may be configured to limit interaction between the driver and the features of the mobile device during attention-sensitive driving conditions. When characteristics of a driving condition in which increased driver attention are detected, and the driver attempts to utilize a feature of the mobile device (e.g., to connect to Siri), a short alert may be invoked by the alert manager to inform the driver that the feature interaction is being delayed or denied. The connection to the feature of the mobile device may then be delayed or disabled until sufficiently low workload conditions return. Thus, by using the connected device adapter interface to the vehicle port, the vehicle may be able to intelligently coordinate driver usage of the features of the connected mobile device in order to balance convenient service access with maintaining driver focus in high driver workload situations.

Figure 1:
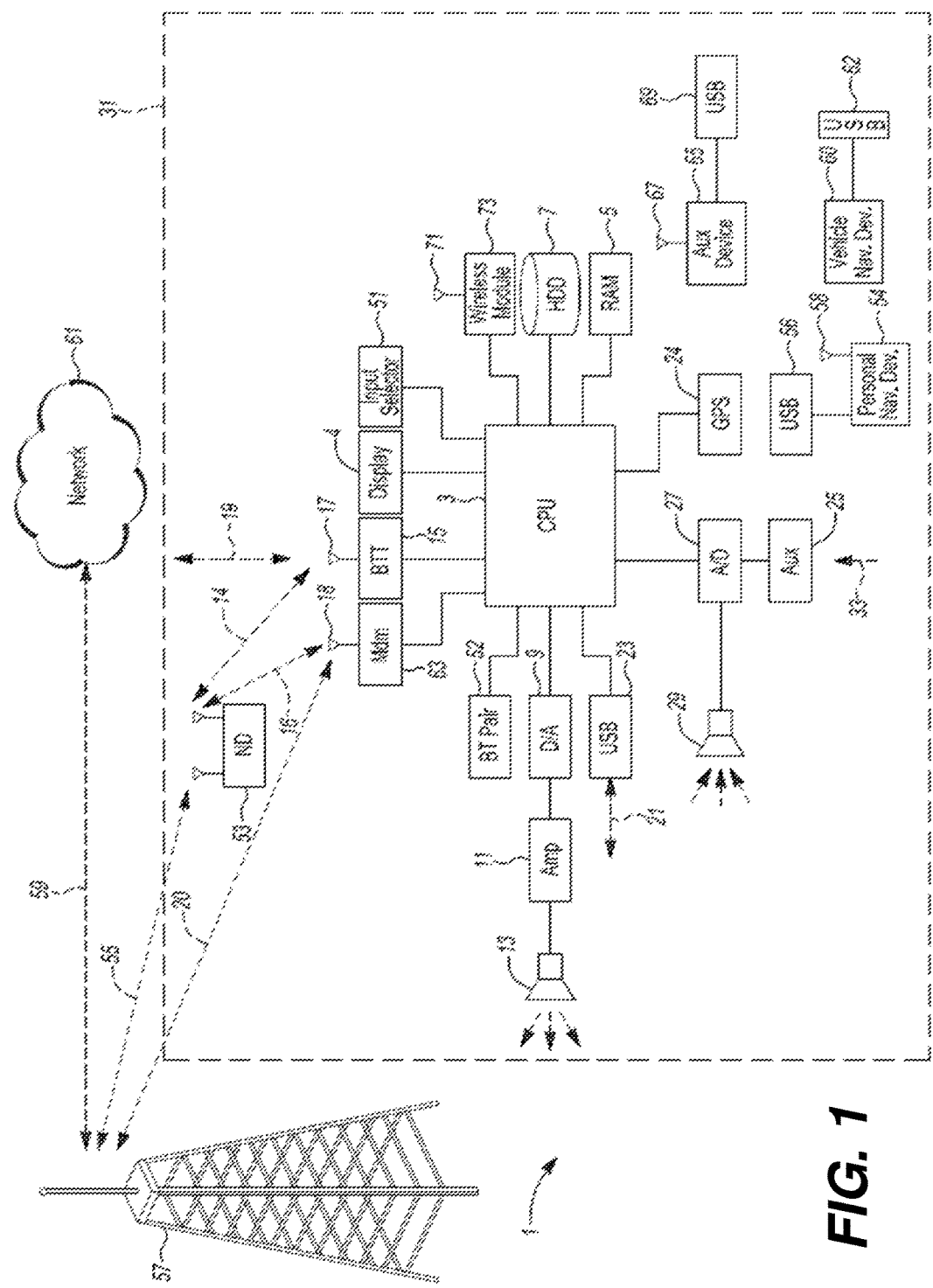
FIG. 1 is an exemplary block topology of a vehicle infotainment system implementing a user-interactive vehicle based computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection.

Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
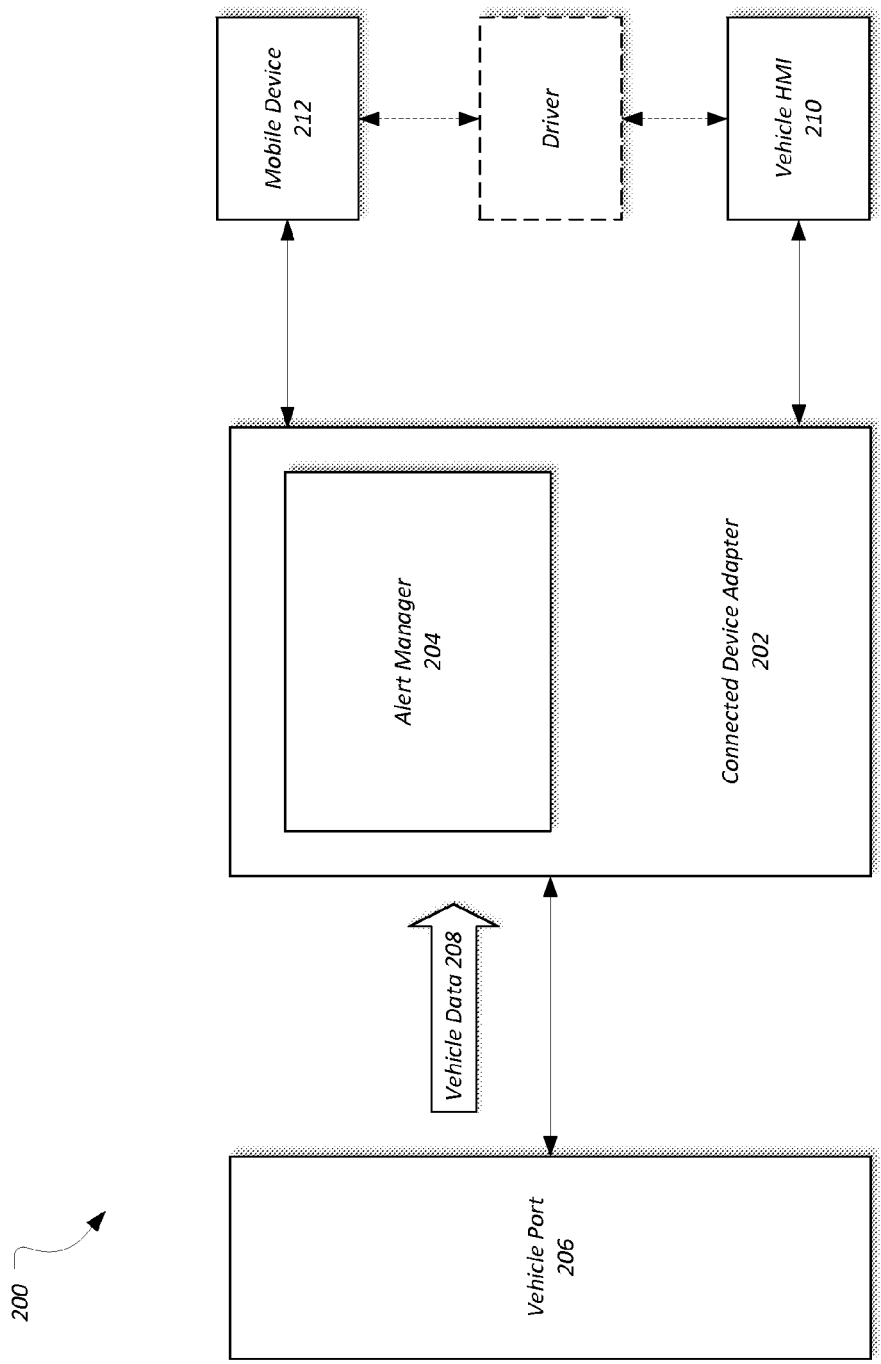
FIG. 2 illustrates an exemplary block diagram of a system including a connected device adapter for facilitating feature interactions with a mobile device.

FIG. 2 illustrates an exemplary block diagram 200 of a system including a connected device adapter 202 for facilitating feature interactions with a mobile device 212. As illustrated, the connected device adapter 202 includes an integrated alert manager 204, and is connected to the vehicle 31 via a vehicle port 206 to receive vehicle data 208. The connected device adapter 202 is further in communication with a mobile device 212 as well as with the vehicle human-machine interface (HMI) 210. It should be noted that the diagram 200 is exemplary, and other arrangements or combinations of elements may be used. As one possibility, the connected device adapter 202 may be implemented as multiple separate modules, such as a separate alert manager 204 and/or separate vehicle port 206 dongle component.

The connected device adapter 202 may include one or more processors or microprocessors configured to execute firmware or software programs stored on one or more memory devices of the connected device adapter 202. The connected device adapter 202 may further include network hardware configured to facilitate communication with other devices of the system. For example, the connected device adapter 202 may support one or more of Bluetooth, WiFi, and wired USB network connectivity to facilitate communication with the mobile device 212.

The alert manager 204 may be one example of an application or firmware program stored on a memory of the connected device adapter 202 (e.g., as software, firmware, etc.). When executed by one or more processors of the connected device adapter 202, the alert manager 204 may be configured to cause the connected device adapter 202 to perform various operations related to identification of workload conditions, as well as delaying or disabling of requested mobile device 212 features when the identified workload conditions indicate that the driver should be focusing on driving rather than on the features of the mobile device 212.

The vehicle port 206 may include one or more interfaces from which vehicle data 208 may be supplied to devices. In an example, the vehicle port 206 may be an OBD-II diagnostic port. The connected device adapter 202 may be configured to connect to the vehicle port 206 to receive the vehicle data 208. The vehicle data 208 provided to the connected device adapter 202 may include, as some non-limiting examples, accelerator pedal position, steering wheel angle, vehicle speed, vehicle location, and vehicle HMI 210 information, such as steering wheel button press information.

The vehicle HMI 210 may include various input hardware and output hardware serving to create a user interface for the driver and/or other vehicle occupants. Exemplary vehicle HMI 210 input hardware may include microphones for capturing audio input, and one or more user controls such as touch-screens, knobs or buttons (e.g., located on the vehicle dash, on the vehicle steering wheel, etc.). The vehicle HMI 210 may also include output hardware, such as one or more displays to provide visual output (e.g., a head unit touch-screen display, a display of the gauge cluster, etc.) and one or more speakers to provide audio output (e.g., via the vehicle 31 audio system).

The mobile device 212 may include any of various types of computing devices, such as a personal computer or laptop, a personal digital assistant (PDA), a mobile phone, a tablet device, a microprocessor-based entertainment appliance, a peer-to-peer communication device or some other type of network-enabled device over which computing services may be provided. As one possibility, the mobile device 212 may be an iPhone manufactured by Apple, Inc. of Cupertino, Calif. Similar to the vehicle HMI 210, the mobile device 212 may include various input hardware and output hardware serving to create a user interface for the user. In some cases, one or more aspects of the user interface of the mobile device 212 may be disabled when the mobile device 212 is connected to the VCS 1 of the vehicle 31. For example, touch screen input to the mobile device 212 may be disabled if the device is currently paired with and in communication with the VCS 1.

Figure 3:
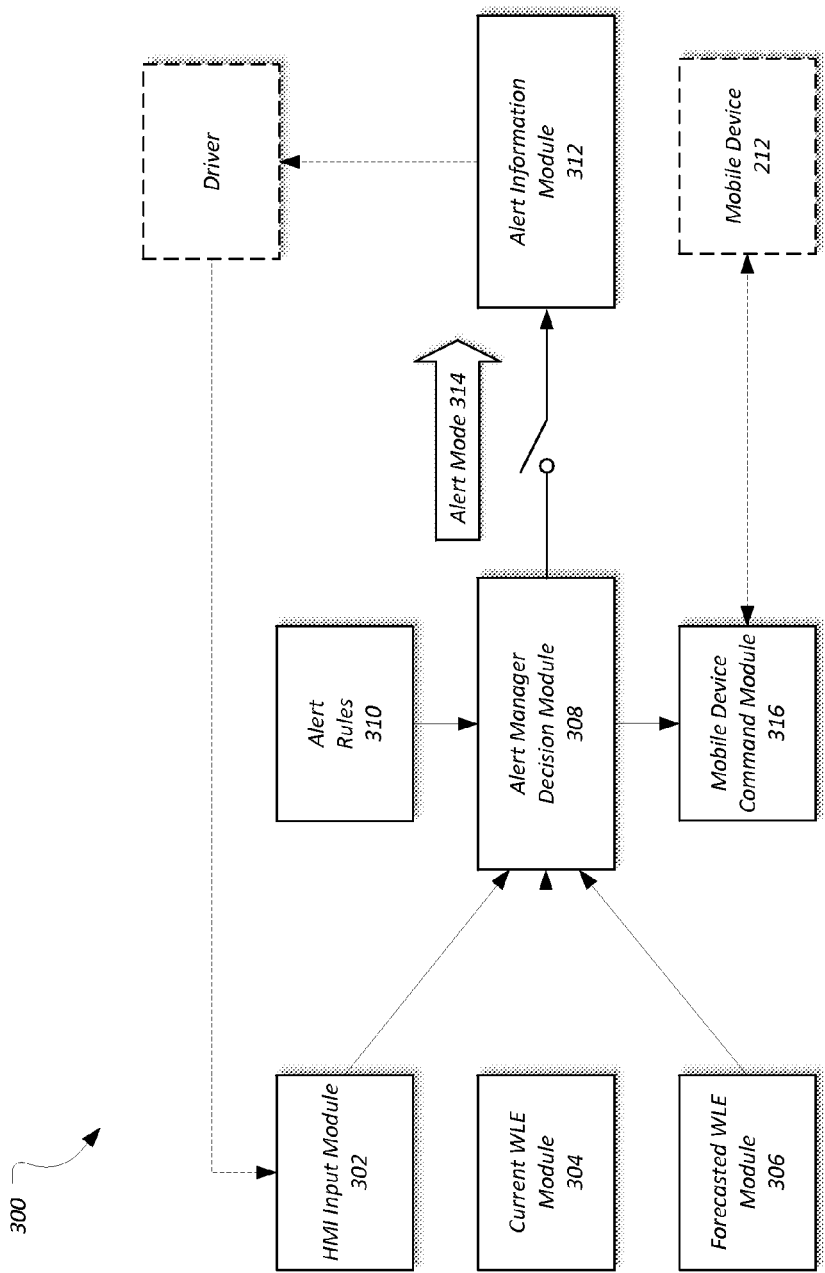
FIG. 3 illustrates an exemplary block diagram of the connected device adapter.

FIG. 3 illustrates an exemplary block diagram 300 of the connected device adapter 202. As illustrated, an alert manager decision module 308 of the alert manager 204 of the connected device adapter 202 receives information such as driver input from an HMI input module 302, current driver demand and workload from a current workload estimation (WLE) module 304, and forecasted driver attention demand from a forecasted WLE module 306. Using the received information, the alert manager decision module 308 determines an alert mode 314 indicative of whether access to features of the connected mobile device 212 should be allowed, delayed or disabled. The alert manager decision module 308 provides the determined alert mode 314 to an alert information module 312 configured to allow, defer, or disallow use of the feature, as well as to notify the user of the alert mode 314 status. If the alert mode 314 indicates that use of the feature is allowed, the connected device adapter 202 may utilize a mobile device command module 316 to invoke the requested feature of the mobile device 212.

The HMI input module 302 may be configured to detect user input to the vehicle HMI 210. For example, the HMI input module 302 may be configured to detect indications of vehicle HMI 210 activity by monitoring vehicle data 208 via the connection of the adapter 202 to the vehicle port 206. These indications of user input may include for example, indications of button down and button up events for various controls of the vehicle HMI 210.

The current WLE module 304 may be configured to identify and provide driver demand and workload information indicative of a level of driver attention necessary for current conditions. The current WLE module 304 may, for example, associate situations such as high traffic density, lane changing, or certain road geometries with relatively higher driving demand. As another example, the current WLE module 304 may associate extreme weather with heightened driving demand, such that, as one possibility, the current WLE module 304 may associate certain weather conditions combined with a medium demand area may be likely to result in a high driving demand area. To make an informed determination of driving demand, the current WLE module 304 may be configured to receive various inputs from the vehicle 31 by monitoring vehicle data 208 via the connection of the adapter 202 to the vehicle port 206. Exemplary inputs monitored by the current WLE module 304 may include, for example, speed, yaw, pitch, roll, lateral acceleration, temperature, and rain sensor inputs provided via the vehicle port 206 from various vehicle sensors. In some cases, the current WLE module 304 may specify current WLE as a value along a scale indicating a relative level of current driver workload.

The forecasted WLE module 306 may be configured to identify and provide information indicative of a probable level of driver attention necessary for future conditions. To do so, the forecasted WLE module 306 may be configured to recognize and track regions where the driving demand and workload tends to be high, e.g., as determined by the current WLE module 304, by association of available latitude/longitude telematics information (e.g., according to the GPS input 24) with current driver demand and workload information computed by the current WLE module 304. Accordingly, the forecasted WLE module 306 may be configured to identify regions of high driving demand, and assign locations associated with relatively higher historical driver demand and workload information with relatively higher forecasted driver attention demand estimates. The forecasted WLE module 306 may be further configured to utilize the maintained historical WLE and location information to provide a forecasted WLE (e.g., based on an average of the historical WLE) for a location that the vehicle 31 may be entering (e.g., a road segment into which the vehicle 31 is driving). In some cases, the forecasted WLE module 306 may specify the forecasted WLE as a value indicating whether or not high workload is expected.

The decision module 308 may be configured to identify an alert mode 314 based on inputs such as current WLE from the current WLE module 304, forecasted WLE from the forecasted WLE module 306, and indications of vehicle HMI 210 activity from the HMI input module 302. As one possibility, the decision module 308 may be invoked based on recognition of vehicle HMI 210 inputs from the driver indicative of requests to engage use of a feature of the mobile device 212. Upon determination the request to use a feature of the mobile device 212 in the vehicle 31 via the vehicle HMI 210, the decision module 308 may be configured to determine an updated alert mode 314 to specify how the connected device adapter 202 should handle the request.

The decision module 308 may be configured to utilize a set of rules 310 to facilitate the determination of the alert mode 314 from the inputs to the decision module 308. Each of the possible alert modes 314 may be characterized according to satisfaction of a rule 310 of the set of rules 310. Thus, the inputs to the decision module 308 may be evaluated against the set of rules 310 to allow the decision module 308 to determine the alert mode 314 for the current situation.

A general rule 310 for the decision module 308 may be of the following form:

alert mode=$m_i$ if $\{(bttn_{press}=x_i)$ and $(wle_{current}=y_i)$ and $(wle_{highforecast}=z_i)\}$ Where $bttn_{press}$ relates to information from HMI input module 302 regarding detected vehicle HMI 210 activity for a specific control, $wle_{current}$ relates to a level of current driver demand as determined by the current WLE module 304, and $wle_{highforecast}$ relates to a level of forecasted driver demand as determined by the forecasted WLE module 306. An exemplary set of alert modes 314 may be as follows:

alert mode=$\{$
  $m_1$ if $\{(bttn_{press}=TRUE)$ and $(wle_{current} \geq \beta_{thres})\}$;
  $m_2$ if $\{(bttn_{press}=TRUE)$ and $(wle_{highforecast}=TRUE)\}$;
  $m_3$ if $\{(feature_{engaged}=TRUE)$ and $(wle_{highforecast}=TRUE)\}$; and
  $m_4$ if $\{(otherwise)\}\}$;

Where:
  $bttn_{press}$ indicates a pressed status of a particular control of the vehicle HMI 210;
  $wle_{current}$ indicates the current WLE determined by the current WLE module 304;
  $wle_{highforecast}$ indicates the forecast WLE determined by the forecasted WLE module 306;
  $\beta_{thres}$ indicates a predetermined threshold current WLE value;
  $feature_{engaged}$ indicates whether feature interaction using a feature or features is currently active;
  $m_1$ indicates a recommendation to delay feature interaction based on current WLE;
  $m_2$ indicates a recommendation to delay feature interaction based on forecast WLE;
  $m_3$ indicates a recommendation to interrupt or postpone feature interaction for a currently active feature integration based on forecast WLE; and
  $m_4$ indicates a recommendation to allow feature interaction.

The alert information module 312 may be configured to facilitate use of features of the mobile device 212, via the connected device adapter 202, in accordance with the alert mode 314 determined by the decision module 308. Based on the aforementioned exemplary set of rules 310, the alert information module 312 may be configured to apply the recommended alert mode 314 (e.g., one of $m_1$, $m_2$, $m_3$ or $m_4$) to the vehicle HMI 210. For instance, for the alert mode 314 of $m_4$, the alert information module 312 may be configured to allow vehicle inputs and output hardware to support the feature (e.g., by utilizing the entertainment system of the vehicle HMI 210 to provide audio output from the feature of the mobile device 212, and by utilizing a microphone or other audio input device of the vehicle HMI 210 to provide audio input to the feature of the mobile device 212). As one specific example, responsive to detection by the connected device adapter 202 of button press of a push-to-talk steering wheel button of the vehicle HMI 210, the connected device adapter 202 may invoke a voice command feature of the connected mobile device 212 (e.g., Siri functionality of an Apple iPhone) to allow use of the voice command feature via the audio input and output hardware of the vehicle HMI 210.

For other alert modes 314, the alert information module 312 may be further configured to implement the delay or denial of the feature interaction. In some cases, based on the alert mode 314, the alert information module 312 may be configured to provide a corresponding alert via the vehicle HMI 210 to inform the driver that use of the feature is being delayed or denied. In some examples, the alert may be provided to the driver as one or more of a sound or a pre-specified voice message or prompt. These alerts may be useful to drivers so that drivers are aware of the reason that they are unable to utilize the requested feature. In some cases, the alert information module 312 may further expose a user interface setting configuration to allow drivers to switch off or receive more terse alerts messages, for those drivers who do not wish to be informed of requests for features that are delayed or denied.

The mobile device command module 316 may be configured to communicate with the mobile device 212 to facilitate the feature interaction. For example, the mobile device command module 316 may be configured to provide commands to the mobile device 212 to cause the mobile device 212 to invoke a requested feature (e.g., a command to invoke a voice communication feature of the mobile device 212). The commands from the mobile device command module 316 to the mobile device 212 may be sent over a connection from the connected device adapter 202 to the mobile device 212, such as via a Bluetooth, WiFi or USB connection, as some examples.

As one illustrative example, the alert information module 312 may be configured to provide a distinct alert sound to the driver via the vehicle HMI 210 if the driver engages an initiation button of the vehicle HMI 210 during a time in which increased driver attention is identified as being required. As another illustrative example, the alert information module 312 may be configured to provide an upcoming attention demand alert via the vehicle HMI 210 if the driver is engaged with a voice communication feature of the mobile device 212 and increased driver attention is forecast for a location that the vehicle 31 is likely to enter (e.g., alert mode 314 of $m_3$ for a driver traveling down a road into a section of road previously associated with relatively higher driver workload demand). Further exemplary aspects of the driver alerts and recommendations are discussed in detail below with respect to the FIGS. 4 and 5A-5B.

Figure 4:
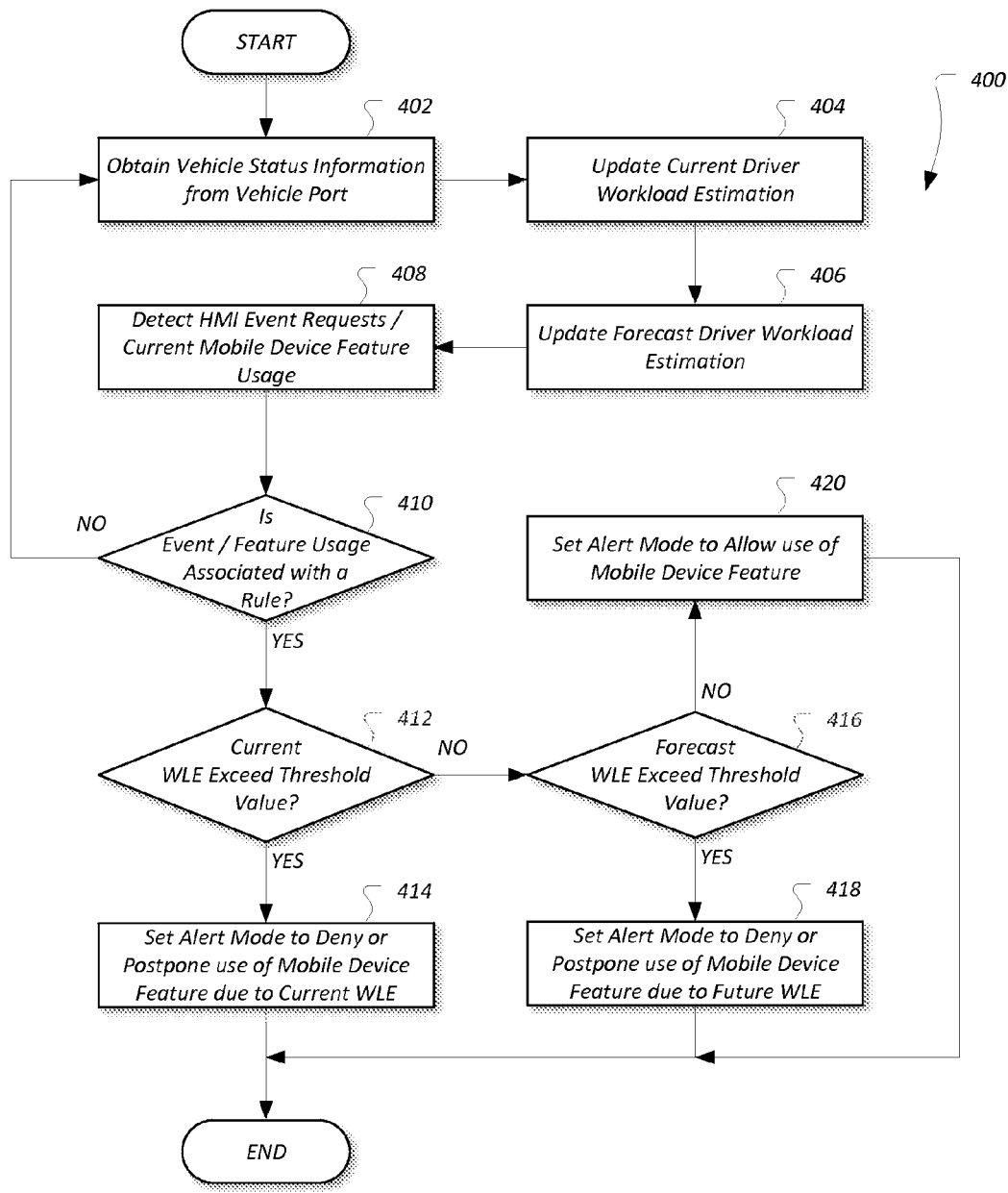
FIG. 4 illustrates an exemplary process for determination of an alert mode by the connected device adapter.

FIG. 4 illustrates an exemplary process 400 for determination of an alert mode 314 by the connected device adapter 202. The process 400 may be performed, for example, by the connected device adapter 202 in communication with the mobile device 212 and vehicle 31.

At block 402, the connected device adapter 202 obtains vehicle status information. For example, the connected device adapter 202 may retrieve, via the vehicle port 206, information indicative of real-time driver inputs, vehicle response and environmental road conditions inputs.

At block 404, the connected device adapter 202 updates a current driver estimation workload for the vehicle 31. For example, the connected device adapter 202 may provide the inputs received in block 402 to the current WLE module 304 to cause the current WLE module 304 to identify and provide driver demand and workload information indicative of a level of driver attention necessary for current conditions.

At block 406, the connected device adapter 202 updates a forecasted driver estimated workload for the vehicle 31. For example, the connected device adapter 202 may provide the current workload estimate from block 404 to the forecasted WLE module 306. The forecasted WLE module 306 may utilize the received information to update maintained latitude/longitude telematics information (e.g., according to the GPS input 24) with the current driver demand and workload information computed by the current WLE module 304. The forecasted WLE module 306 may also utilize the maintained information about locations and historical workloads to predict future driver workload, e.g., by determining a location that the vehicle 31 is likely to enter (e.g., traveling down a road, and further by retrieving or computing average historical workload for the section of road into which the vehicle 31 is headed.

At block 408, the connected device adapter 202 detects an HMI event via the vehicle port 206. For example, the connected device adapter 202 may detect, via the vehicle port 206, generated events indicative of user input to the vehicle HMI 210. The detected HMI event may include, for example, an indication of a button press of a user requesting feature interaction with a feature of the mobile device 212 connected to the connected device adapter 202. As another example, the connected device adapter 202 may track whether there is continued usage of a feature of the mobile device 212 that is currently being utilized (e.g., Siri is still active).

At decision block 410, the connected device adapter 202 determines whether the HMI event is associated with an alert rule 310. For example, the connected device adapter 202 may retrieve and/or process any rules 310 that indicate conditions associated with the HMI event (e.g., rules 310 associated with the button that was pressed, alert rules 310 associated with the feature associated with the button that was pressed, common rules 310 to all controls, etc.). As another example, to facilities the postponement of continued use of the feature, the connected device adapter 202 may retrieve and/or process any rules 310 that indicate conditions associated with a feature of the mobile device 212 that is currently being utilized. If any relevant alert rules 310 are located, control passes to decision block 412. Otherwise, control passes to block 402.

At decision block 412, the connected device adapter 202 determines whether the current workload is at least at a predetermined threshold. For example, the connected device adapter 202 may identify whether the alert rule 310 identified at block 410 specifies a current workload threshold, and if so, whether the current workload determined at block 404 is within the predetermined threshold. If current workload exceeds the predetermined threshold, control passes to block 414. Otherwise, control passes to decision block 416.

At block 414, the connected device adapter 202 sets the alert mode 314 to postpone current feature usage or to deny initiation of use of the feature of the mobile device 212 due to the current workload estimation exceeding the predetermined threshold. After block 414, the process 400 ends.

At decision block 416, the connected device adapter 202 determines whether the forecast workload is at least at a predetermined threshold. For example, the connected device adapter 202 may identify whether the alert rule 310 identified at block 410 specifies a forecast workload threshold, and if so, whether the current workload determined at block 404 is within the predetermined threshold. If forecast workload exceeds the predetermined threshold, control passes to block 418. Otherwise, control passes to block 420.

At block 418, the connected device adapter 202 sets the alert mode 314 to postpone current feature usage or to deny initiation of use of the feature of the mobile device 212 due to the forecast workload estimation exceeding the predetermined threshold. After block 418, the process 400 ends.

At block 420, the connected device adapter 202 sets the alert mode 314 to allow use of the feature of the mobile device 212. After block 420, the process 400 ends.

Figure 5A:
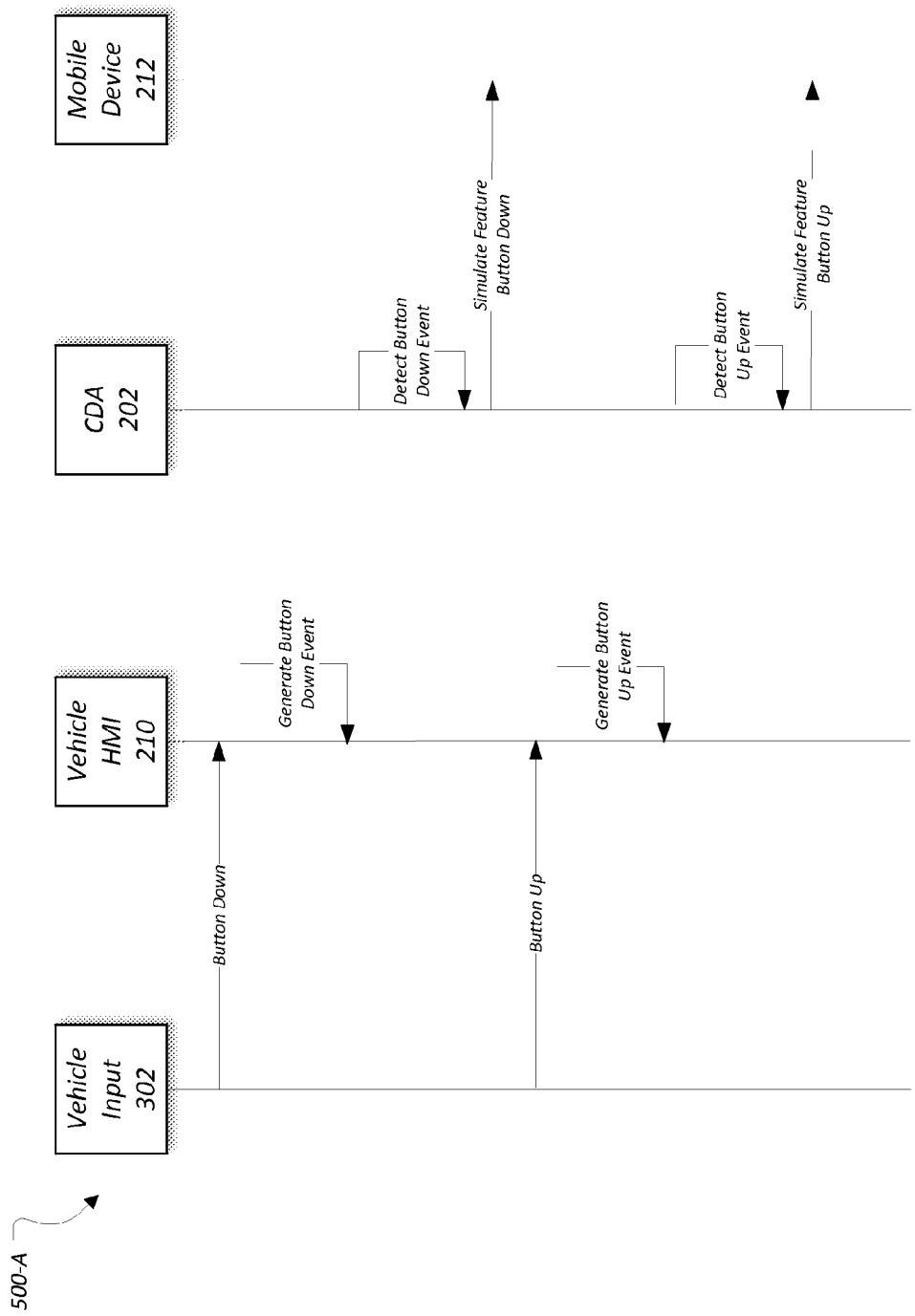
FIG. 5A illustrates an exemplary flow diagram for processing of a feature interaction in which the feature interaction is allowed by the connected device adapter.

FIG. 5A illustrates an exemplary flow diagram 500-A for processing of a feature interaction in which the feature interaction is allowed by the connected device adapter 202. As illustrated, the flow may be initiated upon the vehicle HMI 210 receiving vehicle input 302 generated by a driver of the vehicle 31. As one example, the driver may press down on a button element of the vehicle HMI 210, such as on a steering wheel-mounted push-to-talk button control. Responsive to the button press, the vehicle HMI 210 may generate a button down event to notify other vehicle 31 components of the event. As one possibility, the vehicle HMI 210 may provide the generated button down event onto the CAN bus or other vehicle 31 communication network.

The connected device adapter 202 may detect the event provided by the vehicle HMI 210. For example, the HMI input module 302 of the connected device adapter 202 may monitor vehicle data 208 via the connection of the adapter 202 to the vehicle port 206 to detect the vehicle HMI 210 activity. Based on the detected activity, the connected device adapter 202 may utilize the decision module 308 to determine the alert mode 314 to be used for processing of the feature request. The alert mode 314 may be determined according to the rules 310, detected vehicle HMI 210, and one or more of current driver demand and workload from the current WLE module 304 and forecasted driver attention demand from the forecasted WLE module 306.

As illustrated, the decision module 308 of the connected device adapter 202 determines an alert mode 314 in which the feature interaction is allowed. This determined may be performed, for example, according to the process 400 discussed in detail above. Thus, the connected device adapter 202 utilizes the mobile device command module 316 to provide a command to the mobile device 212. For example, the mobile device command module 316 may provide a command to the mobile device 212 to simulate a button down event for a button of the mobile device 212 associated with the requested feature interaction.

Similarly, the vehicle HMI 210 may generate and provide a button up event when the button is released, and the connected device adapter 202 may detect the button up event and simulate it to the mobile device 212. Upon receipt of the simulated button up to the button of the mobile device 212 associated with the requested feature interaction, the mobile device 212 may invoke or otherwise access the requested feature. In some cases, to facilitate the feature interaction, the connected device adapter 202 may forward audio output from the mobile device 212 to the vehicle 31 for playback through the audio output of the vehicle HMI 210, and may forward audio input from a microphone or other audio capture component of the vehicle HMI 210 to the mobile device 212.

Figure 5B:
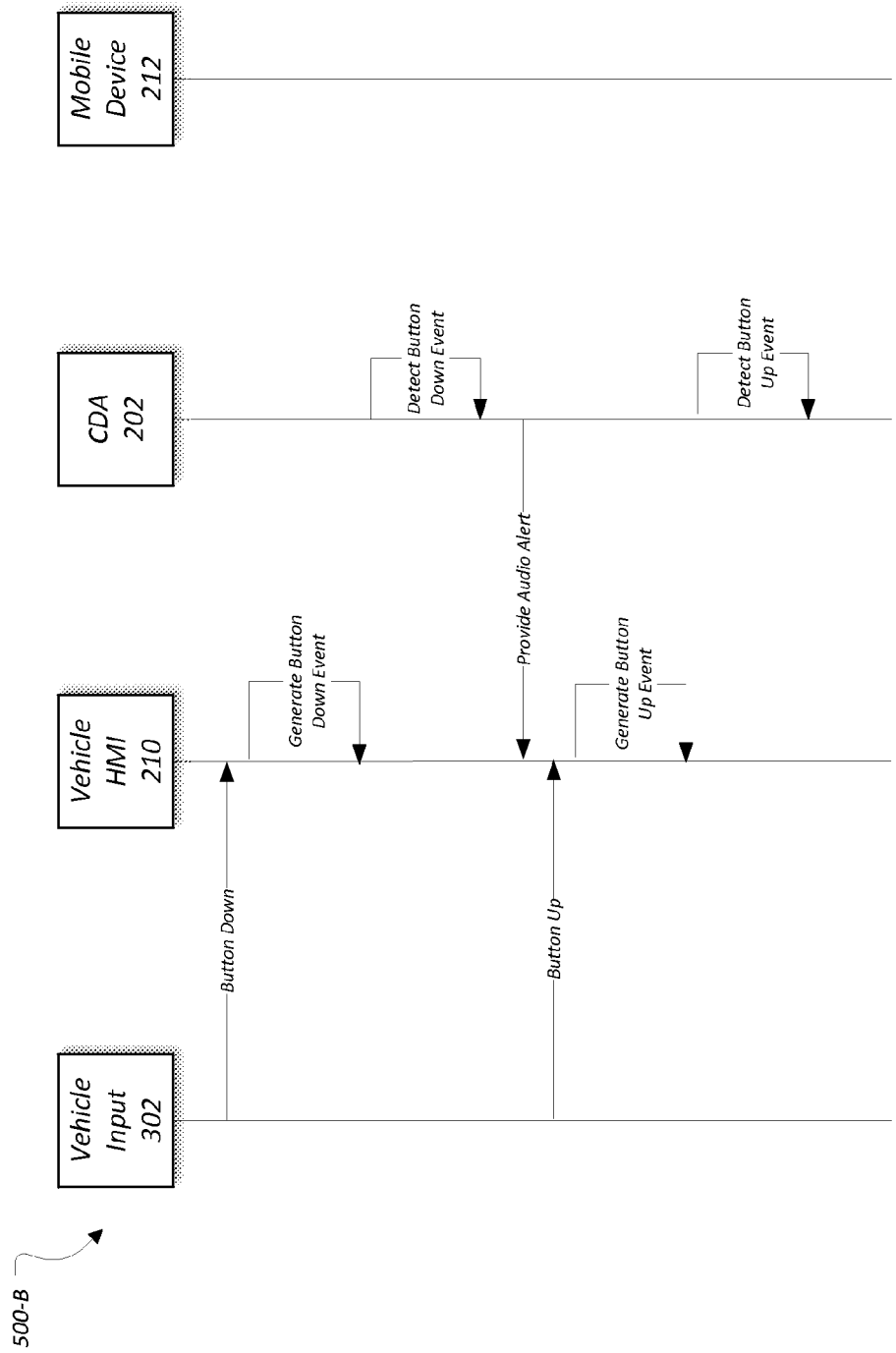
FIG. 5B illustrates an alternate exemplary flow diagram for processing of a feature interaction in which the feature interaction is denied by the connected device adapter.

FIG. 5B illustrates an alternate exemplary flow diagram 500-B for processing of a feature interaction in which the feature interaction is denied by the connected device adapter 202. Similar to the flow diagram 500-A, the flow may be initiated upon the vehicle HMI 210 receiving vehicle input 302 generated by a driver of the vehicle 31, where responsive to the button press, the vehicle HMI 210 may generate a button down event to notify other vehicle 31 components of the event. The connected device adapter 202 may detect the event provided by the vehicle HMI 210. Based on the detected activity, the connected device adapter 202 may utilize the decision module 308 to determine the alert mode 314 to be used for processing of the feature request. However, in the flow diagram 500-B the decision module 308 of the connected device adapter 202 determines an alert mode 314 in which the feature interaction is denied. This determination may be performed, for example, according to the process 400 discussed in detail above.

Accordingly as the feature interaction is denied, rather than utilizing the mobile device command module 316 to provide a command to the mobile device 212, the connected device adapter 202 may instead utilize the alert information module 312 to provide an alert via the vehicle HMI 210 indicating that the feature interaction is not being allowed. The alert may specify a reason for the denial, e.g., based on the specific alert mode 314 determined, such as that the current workload makes use of the feature interaction inadvisable, or that the estimated future workload makes use of the feature interaction inadvisable.

Thus, by using the connected device adapter 202, the vehicle 31 may be able intelligently coordinate driver usage of the features of the connected mobile device 212 in order to balance convenient service access with maintaining driver focus in high driver workload situations.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a device configured to connect to a vehicle data port and a mobile device, and including an alert manager configured to
        determine, according to a driver workload estimation performed using data received from the data port, an alert mode indicative of how to process a vehicle user-interface request to use a mobile device feature, and
        access the mobile device feature via the vehicle user-interface according to the alert mode.

2. The system of claim 1, wherein the alert modes include a first mode in which use of the feature of the mobile device is allowed, and a second mode in which use of the feature of the mobile device is denied.

3. The system of claim 2, wherein the alert modes include a third mode in which use of the feature of the mobile device is delayed.

4. The system of claim 2, wherein the device is further configured to provide an alert via the vehicle user-interface indicating that the feature cannot be used when the alert mode is a mode in which use of the feature of the mobile device is at least one of: (i) delayed, (ii) postponed, or (iii) denied.

5. The system of claim 1, wherein the driver workload estimation includes a current driver estimation of workload, the current driver estimation of workload determined according to at least one of vehicle sensor inputs and weather conditions.

6. The system of claim 1, wherein the driver workload estimation includes a forecasted driver estimation of future workload, the forecasted driver estimation determined according to vehicle location and a mapping of locations to historical driver workload estimations.

7. The system of claim 1, wherein the request to use the feature of the mobile device includes a press of a steering wheel button of the vehicle user interface, the feature of the mobile device include a voice command system to be used via an audio system of the vehicle user-interface.

8. A method comprising:
    determining an alert mode indicative of how to process a vehicle user-interface request to use a mobile device feature, by an alert manager of a device connecting to a vehicle data port and a mobile device, according to a driver workload estimation performed using data received from the data port; and accessing the mobile device feature via the vehicle user-interface according to the alert mode.

9. The method of claim 8, wherein the alert modes include a first mode in which use of the feature of the mobile device is allowed, and a second mode in which use of feature of the mobile device is denied.

10. The method of claim 9, wherein the alert modes include a third mode in which use of the feature of the mobile device is delayed.

11. The method of claim 9, wherein the device is further configured to provide an alert via the vehicle user-interface indicating that the feature cannot be used when the alert mode is a mode in which use of the feature of the mobile device is at least one of: (i) delayed, (ii) postponed, or (iii) denied.

12. The method of claim 8, wherein the driver workload estimation includes a current driver estimation of workload, the current driver estimation of workload determined according to at least one of vehicle sensor inputs and weather conditions.

13. The method of claim 8, wherein the driver workload estimation includes a forecasted driver estimation of future workload, the forecasted driver estimation determined according to vehicle location and a mapping of locations to historical driver workload estimations.

14. The method of claim 8, wherein the request to use the feature of the mobile device includes a press of a steering wheel button of the vehicle user interface, the feature of the mobile device include a voice command system to be used via an audio system of the vehicle user-interface.

15. A non-transitory computer-readable medium including instructions that, when executed by an alert manager of a device connecting to a vehicle data port and a mobile device, cause the device to:

determine an alert mode indicative of how to process a vehicle user-interface request to use a mobile device feature according to a driver workload estimation performed using data received from the data port; and access the mobile device feature via the vehicle user-interface according to the alert mode.

16. The computer-readable medium of claim 15, wherein the alert modes include a first mode in which use of the feature of the mobile device is allowed, and a second mode in which use of feature of the mobile device is denied.

17. The computer-readable medium of claim 16, wherein the alert modes include a third mode in which use of the feature of the mobile device is delayed.

18. The computer-readable medium of claim 16, wherein the device is further configured to provide an alert via the vehicle user-interface indicating that the feature cannot be used when the alert mode is a mode in which use of the feature of the mobile device is at least one of: (i) delayed, (ii) postponed, or (iii) denied.

19. The computer-readable medium of claim 15, wherein the driver workload estimation includes a current driver estimation of workload, the current driver estimation of workload determined according to at least one of vehicle sensor inputs and weather conditions.

20. The computer-readable medium of claim 15, wherein the driver workload estimation includes a forecasted driver estimation of future workload, the forecasted driver estimation determined according to vehicle location and a mapping of locations to historical driver workload estimations.

* * * * *